United States Patent
Pytel et al.

(10) Patent No.: US 9,495,400 B2
(45) Date of Patent: Nov. 15, 2016

(54) DYNAMIC OUTPUT SELECTION USING HIGHLY OPTIMIZED DATA STRUCTURES

(71) Applicant: International Business Machines, Armonk, NY (US)

(72) Inventors: Alexei L. Pytel, Rochester, MN (US); Kevin J. Kathmann, Rochester, MN (US); Steven J. Simonson, Rochester, MN (US); Thomas J. Wasik, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 13/632,613

(22) Filed: Oct. 1, 2012

(65) Prior Publication Data
US 2014/0095531 A1 Apr. 3, 2014

(51) Int. Cl.
*G06F 7/00* (2006.01)
*G06F 17/30* (2006.01)
*H04L 9/00* (2006.01)

(52) U.S. Cl.
CPC .......... *G06F 17/30327* (2013.01); *H04L 9/00* (2013.01)

(58) Field of Classification Search
CPC .................. G06F 17/30501; G06F 17/30327; G06F 17/30867; H04L 9/00
USPC .......... 707/102, 100, E17.05, E17.04, 999.1, 707/999, 999.102, 769, 999.001, 737; 715/854
See application file for complete search history.

(56) References Cited

U.S. PATENT DOCUMENTS

| | | | |
|---|---|---|---|
| 6,185,557 | B1 | 2/2001 | Liu |
| 7,499,910 | B2 | 3/2009 | Schneider et al. |
| 7,669,147 | B1 | 2/2010 | Molander et al. |
| 2003/0009443 | A1* | 1/2003 | Yatviskiy ................. 707/1 |
| 2004/0133537 | A1 | 7/2004 | Uceda-Sosa |
| 2006/0106832 | A1* | 5/2006 | Ben-Dyke et al. ........... 707/100 |
| 2007/0059685 | A1 | 3/2007 | Kohne |
| 2007/0100803 | A1* | 5/2007 | Cava .................... 707/3 |
| 2008/0086452 | A1 | 4/2008 | Jonas et al. |
| 2009/0164947 | A1 | 6/2009 | Taylor et al. |
| 2009/0182766 | A1* | 7/2009 | Draese .................. 707/102 |
| 2010/0049693 | A1 | 2/2010 | Cao et al. |
| 2012/0166419 | A1 | 6/2012 | Enoki et al. |
| 2012/0203740 | A1* | 8/2012 | Ben-Dyke et al. ........... 707/639 |
| 2014/0095508 | A1* | 4/2014 | Pytel et al. ................ 707/740 |
| 2014/0101164 | A1* | 4/2014 | Pytel et al. ................ 707/740 |

OTHER PUBLICATIONS

Lee et al, "Dynamic Access Path Determination for Tuple Selection", Technical Disclosure, Feb. 15, 2005, pp. 1-4.

(Continued)

*Primary Examiner* — James Trujillo
*Assistant Examiner* — John J Morris
(74) *Attorney, Agent, or Firm* — Cantor Colburn LLP; William A. Kinnaman, Jr.

(57) ABSTRACT

A node container is constructed with multiple binary tree views. A processing device creates a primary view binary tree within the node container based on a primary key. A set of records that match fields of the primary key is chained to the primary view. The processing device also creates one or more alternate views within the node container to allow access to the same set of records via one or more alternate keys, which are subsets of the fields of the primary key. The chain of records is extracted from the node container when matched to a subsequent query search.

21 Claims, 4 Drawing Sheets

(56) References Cited

OTHER PUBLICATIONS

Chakrabarti et al "Method and System for Matching DOM Trees to Search Logs for Accurate Webpage Clustering", Technical Disclosure, Defensive Publication, Apr. 30, 2010, pp. 1-6.

Gururaj et al, "Method and System for Caching Metadata Associated with Complex Pathing Analysis Queries", Technical Disclosure, Defensive Publication, Oct. 14, 2010, pp. 1-7.

Moore et al "Cached Sufficient Statistics for Efficient Machine Learning with Large Datasets", CMU-RI-TR-97-27, The Robotics Institute, Jul. 1997; pp. 1-23.

\* cited by examiner

DYNAMIC OUTPUT SELECTION USING HIGHLY OPTIMIZED DATA STRUCTURES

BACKGROUND

The present invention relates to a heuristic search mechanism, and more specifically, to an extendable search mechanism using a node container with multiple binary tree views for fixed sized objects with limited expansion in shared storage.

Contemporary multi-image operating system environments share a single set of data amongst all operating system images. Sharing allows processes on one image to share processing capabilities and responsibilities with other images. Typically, objects within shared storage are stored in a fixed record table format. This fixed format has drawbacks when new requirements must be considered. When objects run short of reserved area they cannot be easily extended due to various members storing offsets to these objects. A resolution to this situation would be to shut down a coupled facility and perform an initialization of the shared storage to accommodate increased size. This type of disruption, however, is not acceptable on enterprise type systems with today's 24×7 availability needs.

SUMMARY

According to an embodiment, a computer program including a computer readable storage medium having computer readable program code stored thereon that, when executed, performs a method for constructing a node container including multiple binary tree views. A processing device creates a primary view binary tree within the node container based on a primary key. The method chains a set of records that match fields of the primary key to the primary view. The processing device also creates one or more alternate views within the node container to allow access to the same set of records via one or more alternate keys, which are subsets of the fields of the primary key. The chain of records is extracted from the node container when matched to a query search.

According to another embodiment, a computer system including a processor, a system memory, and a bus is configured to perform a method for constructing a node container including multiple binary tree views. A processing device creates a primary view binary tree within the node container based on a primary key. The method chains a set of records that match fields of the primary key to the primary view. The processing device also creates one or more alternate views within the node container to allow access to the same set of records via one or more alternate keys, which are subsets of the fields of the primary key. The chain of records is extracted from the node container when matched to a query search.

According to another embodiment a computer-implemented method is provided for constructing a node container including multiple binary tree views. A processing device creates a primary view binary tree within the node container based on a primary key. The method chains a set of records that match fields of the primary key to the primary view. The processing device also creates one or more alternate views within the node container to allow access to the same set of records via one or more alternate keys, which are subsets of the fields of the primary key. The chain of records is extracted from the node container when matched to a query search.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein disclose an extendable search mechanism for objects with limited expansion capabilities. A node container is constructed with multiple binary tree views, including a primary view and one or more alternate views. A set of records that match fields of the primary key is chained to the primary view and the chain of records is extracted from the node container when a primary or alternate view is matched to a query search.

Processing for work selection takes a set of selection criteria associated with a device and pairs it with output element groups to see if they match. Output element groups reside within a checkpoint on a coupling facility or direct access storage device (DASD). The output element group area is a table of limited, fixed-length areas whose location within the checkpoint must not change.

Chaining the output elements together to minimize the number of elements to be examined optimizes the way in which customers can organize their output. But as time and processing has changed, this method of optimization has become less effective. This is especially true as customers move from real devices to process output to logical devices controlled by speech application programming interface (SAPI). The pairing code must be run for each potential output element in order to return the most relevant output element for the device.

An embodiment of the disclosure compiles heuristic information on selection criteria so that output elements will be chained in optimal sequence. Size of free space within the output element group is very limited and only one set of forward/backward chaining fields are generally available. Embodiments support fast access with multiple views of similar data given limited free space. Also, due to the heuristic qualities of an embodiment, adjustments are made to dynamically satisfy changing customer requirements.

Figure 1:
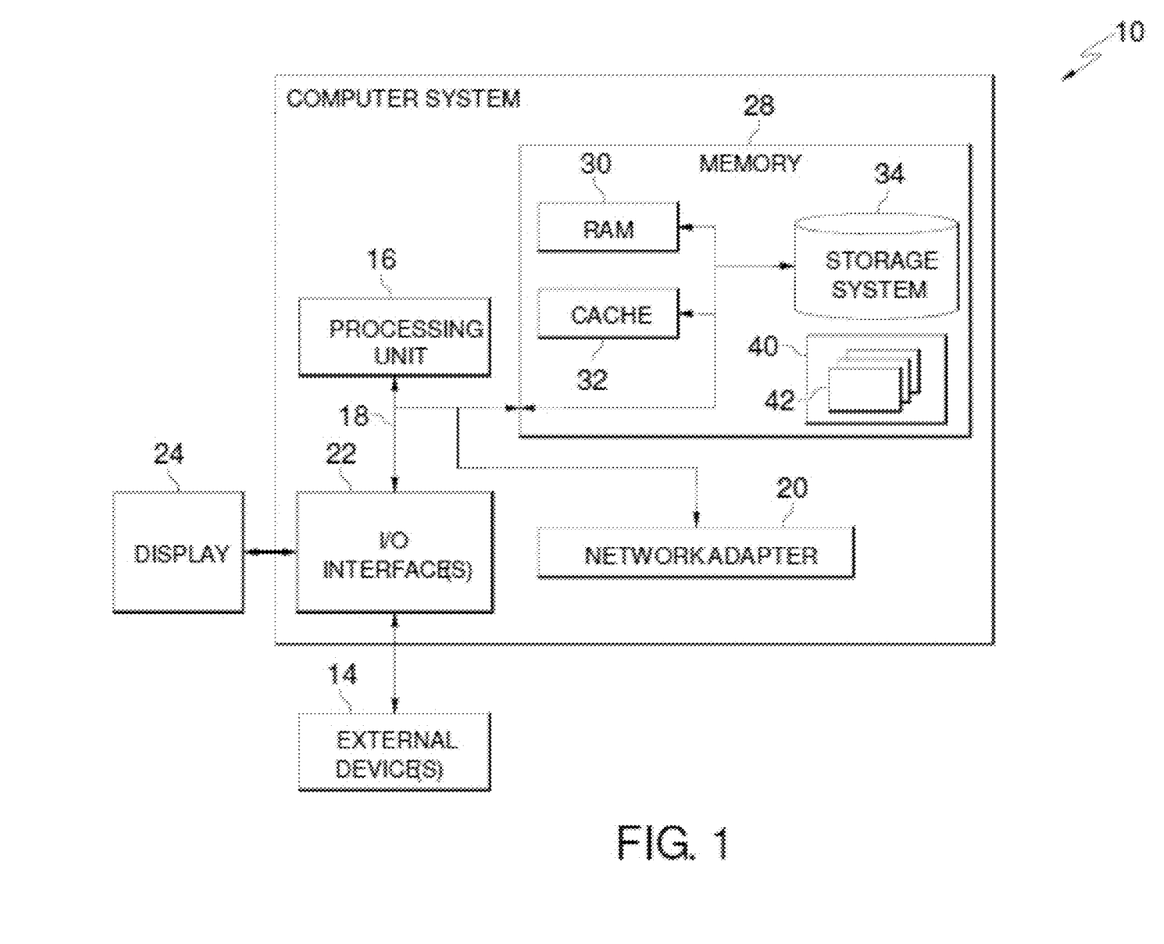
FIG. 1 depicts a block diagram of a computer system according to an embodiment.

Referring now to FIG. 1, a block diagram of a computer system 10 suitable for implementing an extendable search mechanism using a node container with multiple binary tree views is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
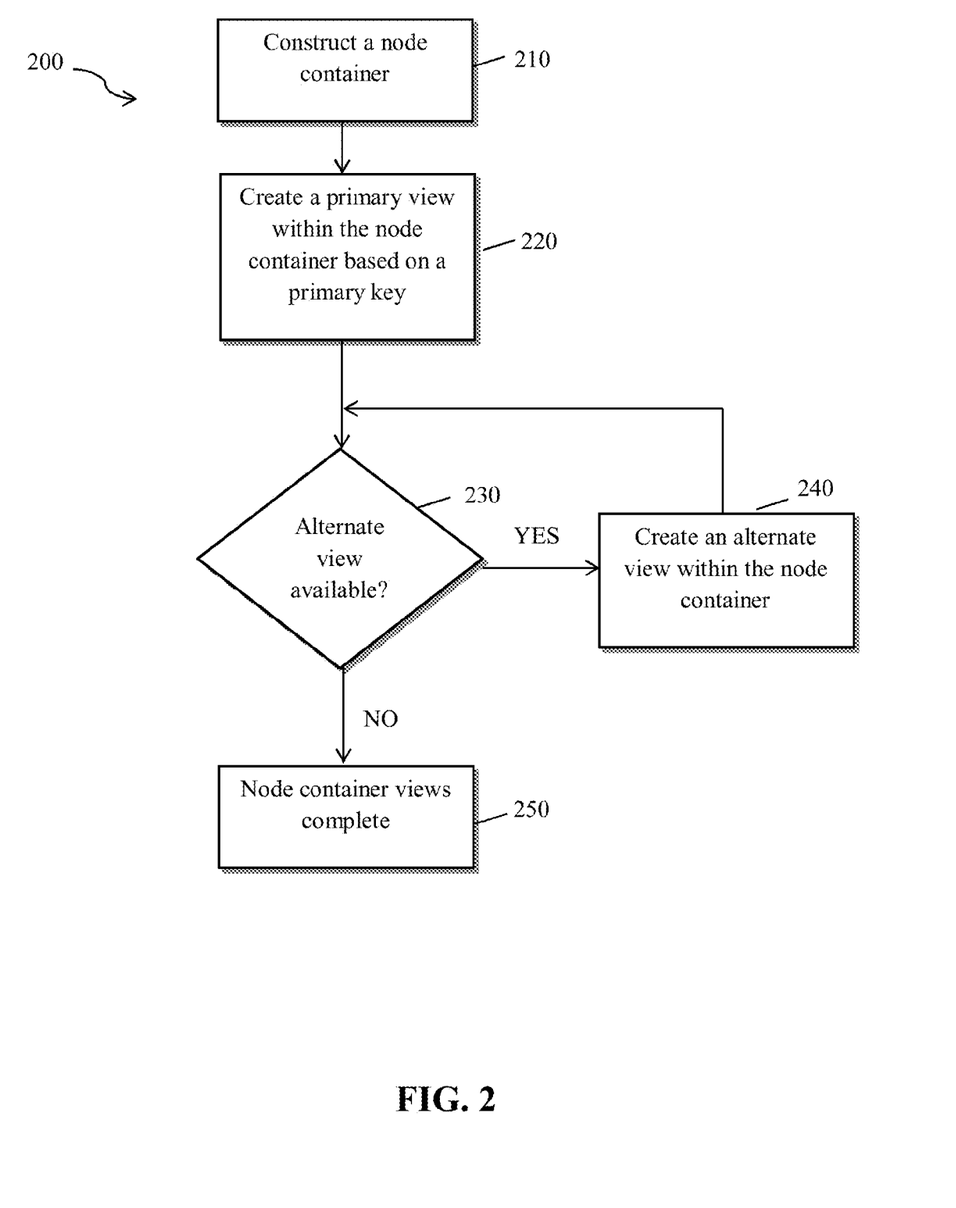
FIG. 2 depicts a flow diagram of a method for node container construction according to an embodiment.

With reference now to FIG. 2, a flow diagram of an exemplary method for constructing a node container 200, in accordance with an embodiment is shown. Referring to FIG. 2, a node container containing one or more binary tree views is constructed in block 210. In block 220, a primary view binary tree is created within the node container based on a primary key. A set of records that match fields of the primary key are chained to the primary view.

If the method determines that subsets of the primary key are available in decision block 230, an embodiment creates one or more alternate views within the node container to allow access to the same set of records via one or more alternate keys, which are subsets based on fields of the primary key as shown in block 240.

If the method determines that subsets of the primary key are not available in decision block 230, the method for adding alternate views to the container node completes as shown in block 250. According to an embodiment, the chain of records is extracted from the node container when the chain matches a query search.

TABLE 1

| Primary KEY | <Primary View> | <Alternate View 1> | <Alternate View 2> |
|---|---|---|---|
| ABC | LE = Node<br>RI = Node BF(0)<br>Record Chain | Key AB<br>LE = Node<br>RI = Node BF(0)<br>Node chain =<br><Prev = Node<br>Next = Node> | Key C<br>LE = Node<br>RI = Node BF(0)<br>Node chain =<br><Prev = Node<br>Next = Node> |

Table 1 shows an embodiment of the exemplary node container. Referring to Table 1, the node container contains one or more binary trees. Each binary tree is termed a view. According to an embodiment, the binary trees can be threaded through multiple non-contiguous node containers.

The primary view of an embodiment contains a composite key and a chain of all records or output elements that match the key. A record or output element can be on one and only one chain. The primary key consists of 1 to n key fields. In Table 1, the primary key is "ABC" with each letter representing a key field. There is only one primary view per node container and each primary view is identified by a unique key.

A primary view of an embodiment is organized as a balanced binary tree with its own root. The primary view terms "LE" and "RI" in Table 1 denote left and right subtree node offsets of the next collated node. In Table 1, both the key value and the node container references are listed. In practice, only a node container reference may be required. The BF is a balance factor (−1, 0, 1) used by a known AVL tree algorithm to assure the tree is balanced at all times and, in turn, assures fast access times.

A node container of an embodiment also contains 0 to n alternate views. An alternate view allows access to the same set of records or output elements via an alternate key, which is a subset of the primary key fields. Although the alternate view is a subset of the primary view, the order of the fields in the alternate view may differ from the primary view.

Table 1 shows two alternate views. The key field for Alternate-View 1 includes primary key fields 1 and 2 and key "AB". The key fields and values are only stored in the primary key and a tree node descriptor is used to define locations of primary and alternate key fields within the node container. A tree node descriptor is an object-oriented approach that allows a definition of tree and nodes so that one set of code may perform all tree operations regardless of tree specifics.

An alternate view is also organized as a balanced binary tree with its own root. Given an alternate key there may be multiple container nodes with records or output elements that may match an alternate key. By definition binary trees do not handle duplicates, so an alternate view contains a doubly linked list of container nodes with primary key of which the alternate key is a subset of. This allows limited real estate within the output element area to support multiple collating views with very fast access.

Embodiments of the container nodes do not need to be contiguous since the underlying access data structure is a binary tree. Access to the records or output elements is only through the binary tree so the container nodes do not share the offset problem of the contemporary art. Also, because the highly optimized structure of an embodiment is in the checkpoint, all members within a tightly coupled complex can see the updates.

Figure 3:
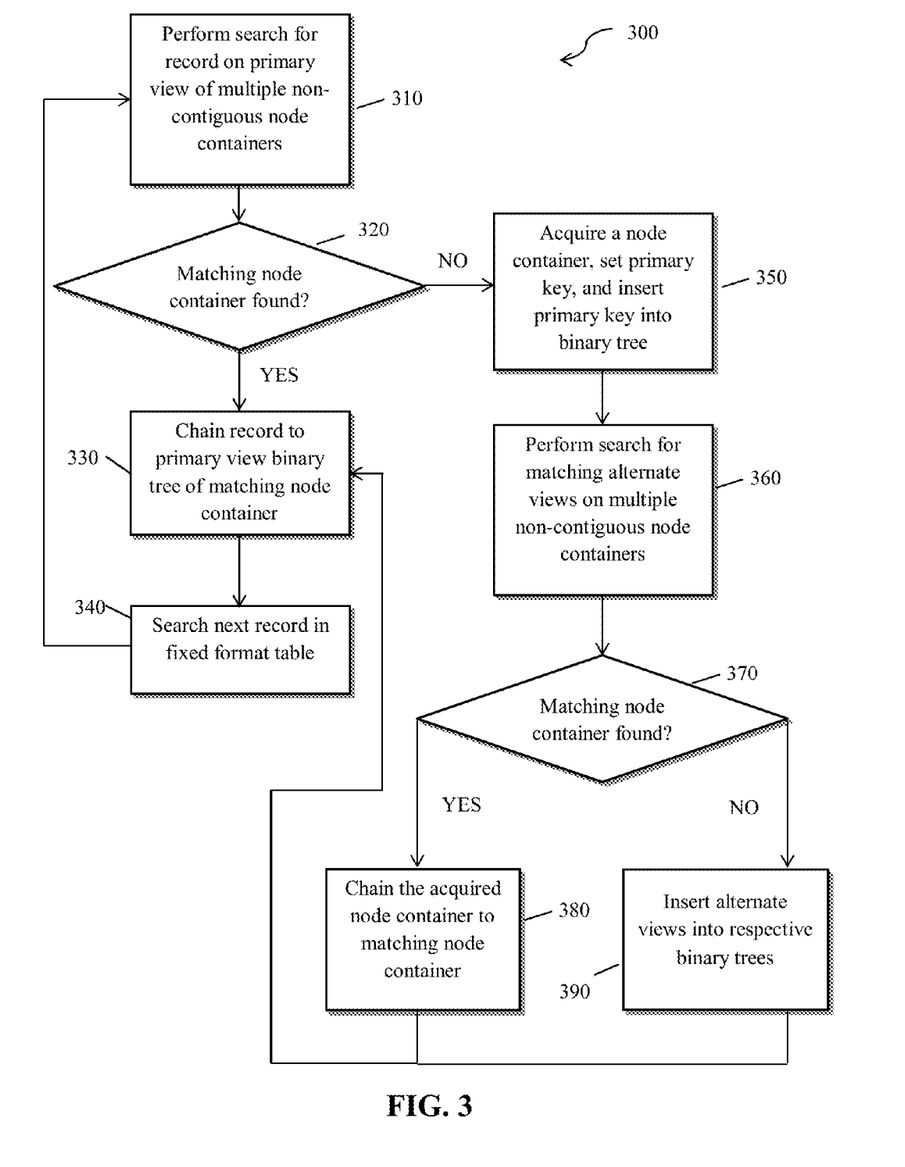
FIG. 3 depicts a flow diagram of a method for chaining records to the node container according to an embodiment.

FIG. 3 illustrates a flow diagram of an exemplary method for chaining records to the node container 300 according to an embodiment. Referring to FIG. 3, a binary search is performed on multiple non-contiguous node containers for a node container with a primary view that matches a search key of a selected record, as shown in block 310. If the processing device finds a container node with a primary view that matches the search key of a selected record in block 320, the selected record is chained to the primary view binary tree of the matching node container in block 330. The processing for the selected record is now complete and the next record in a fixed format table is searched as shown in block 340.

If the processing device does not find a container node with a primary view that matches the search key of a selected record in block 320, a container node is acquired in block 350. The primary key is set for the acquired container node and inserted into the binary tree of the primary view. In block 360, a binary search is now performed on the multiple non-contiguous node containers for a node container with an alternate view that matches a search key of the selected record.

If the processing device finds an existing node container with an alternate view that matches the search key of the selected record in decision block 370, the acquired node container is chained to the existing node container as shown in block 380. The selected record is then chained to the primary view binary tree of the matching node container as shown in block 330. The processing for the selected record is now complete and the next record in a fixed format table is searched as shown in block 340.

If the processing device does not find an existing node container with an alternate view that matches the search key of the selected record in decision block 370, the alternate view is inserted into the alternate view binary tree using tree node descriptors. The selected record is then chained to the primary view binary tree of the matching node container as shown in block 330. The processing for the selected record is now complete and the next record in a fixed format table is searched as shown in block 340.

TABLE 2

| Record # | Class | Destination | Disposition |
| --- | --- | --- | --- |
| 1 | A | B | C |
| 2 | A | B | D |
| 3 | E | A | E |
| 4 | A | B | F |
| 5 | E | A | C |
| 6 | B | D | E |
| 7 | B | E | G |
| 8 | E | A | F |
| 9 | A | B | C |
| 10 | E | A | E |
| 11 | A | B | F |
| 12 | E | A | F |
| 13 | B | D | E |
| 14 | B | D | A |

An example of a fixed record table of an embodiment is shown in Table 2. Referring to Table 2, the heuristic method of an embodiment has determined that customer installation typically selects printed output the key fields Class/Destination/Disposition, Class/Destination, or just Disposition. In our example, we will assume a three byte primary key with three key fields for simplicity.

When a member acquires a checkpoint and runs the fixed record table shown in Table 2 for each unique class/destination/disposition combination, a unique container node is created using the exemplary methods for constructing a node container 200 and chaining records to the node container 300 according to embodiments of the disclosure. The records are processed in the sequence listed in Table 2.

Figure 4A:
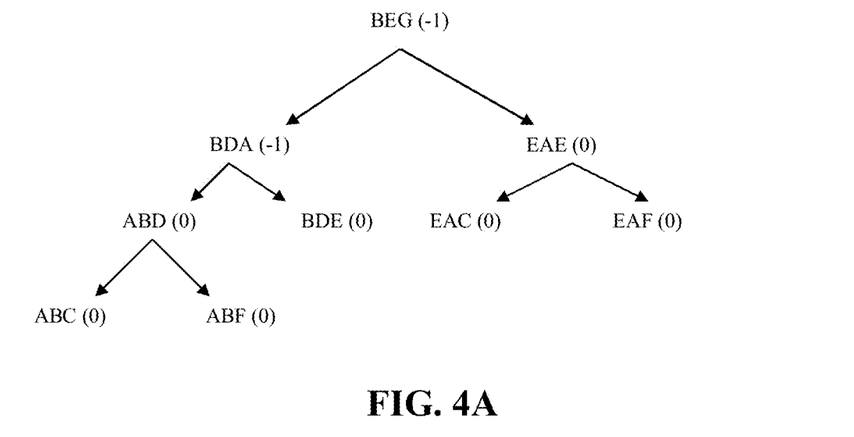
FIG. 4A depicts a binary tree built for a primary view of the container node according to an embodiment.
Figure 4B:
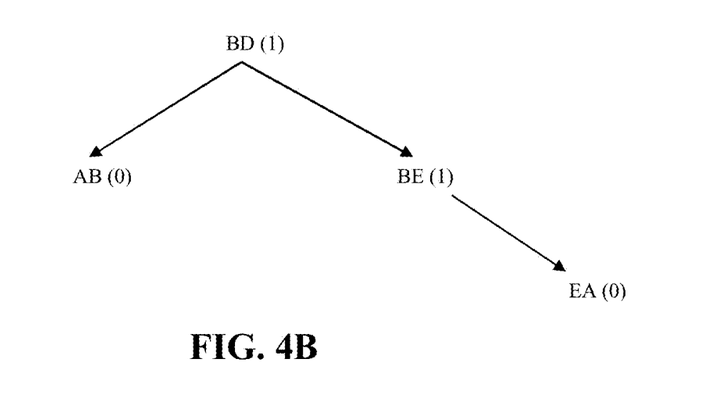
FIG. 4B depicts a binary tree built for an alternate view of the container node according to an embodiment.
Figure 4C:
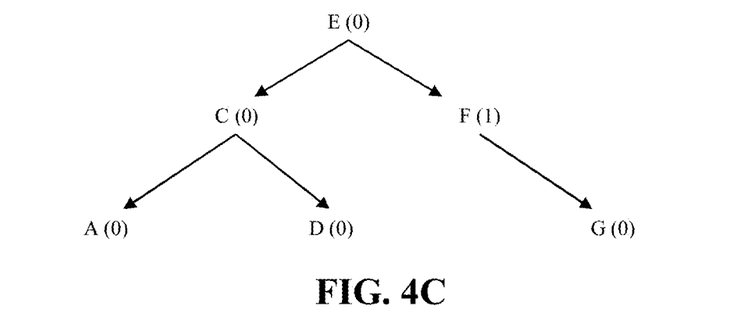
FIG. 4C depicts a binary tree built for another alternate view of the container node according to an embodiment.

Referring to FIG. 4A, an example of a balanced binary tree built for the primary view of the container node with primary key fields "Class/Destination/Disposition" is shown. The numbers by each node are a balance factor derived by height of right subtree minus height of left subtree. The number is used by a known standard balancing algorithm to keep the tree balanced and search optimized at all times. Each key in FIG. 4A represents a container node. FIG. 4B illustrates an example of a balanced tree built for one alternate view of the container node with alternate key fields "Class/Destination". FIG. 4C illustrates an example of a balanced tree built for another alternate view of the container node with alternate key field "Disposition".

Referring to the node containers shown in Table 3, a matching record chain is extracted from a container node using a binary search when a device requests a record or an output element. For example, when a device requests a

TABLE 3

| Primary KEY | <Primary View> | <Alternate View 1> | <Alternate View 2> |
|---|---|---|---|
| | | Node container 20 | |
| ABC | LE = 0 RI = 0 BF(0) | Key AB<br>LE = 0 RI = 0 BF(0) | Key C<br>LE = A (node 28) RI = D (node 21) BF(0) |
| | Chain: Records 1<->9 | Node chain =<br><Prev = 23 Next = 21> | Node chain =<br><Prev = 24 Next = 24> |
| | | Node container 21 | |
| ABD | LE = ABC (node 24)<br>RI = ABF (node 23) BF(0)<br>Chain: Record 2 | Key AB - This view not in binary tree but is chained.<br>Node chain =<br><Prev = 20 Next = 23> | Key D<br>LE = 0 RI = 0 BF(0)<br>Node chain =<br><Prev = 21 Next = 21> |
| | | Node container 22 | |
| EAE | LE = EAC (node 24)<br>RI = EAF (node 27) BF(0) | Key EA<br>LE = 0 RI = 0 BF(0) | Key E<br>LE = C (node 20) RI = F (node 23) BF(0) |
| | Chain: Records 3<->10 | Node chain =<br><Prev = 27 Next = 24> | Node chain =<br><Prev = 25 Next = 25> |
| | | Node container 23 | |
| ABF | LE = 0 RI = 0 BF(0) | Key AB - This view not in binary tree but is chained | Key F<br>LE = 0 RI = G (node 26) BF(1) |
| | Chain: Records 4<->11 | Node chain =<br><Prev = 21 Next = 20> | Node chain =<br><Prev = 27 Next = 27> |
| | | Node container 24 | |
| EAC | LE = 0 RI = 0 BF(0) | Key EA - This view not in binary tree but is chained. | Key C - This view not in binary tree but is chained. |
| | Chain: Records 5 | Node chain =<br><Prev = 22 Next = 27> | Node chain =<br><Prev = 20 Next = 20> |
| | | Node container 25 | |
| BDE | LE = 0 RI = 0 BF(0) | Key BD<br>LE = AB (node 20)<br>RI = BE (node 26) BF(1) | Key E - This view not in binary tree but is chained. |
| | Chain: Records 6<->13 | Node chain =<br><Prev = 28 Next = 28> | Node chain =<br><Prev = 22 Next = 22> |
| | | Node container 26 | |
| BEG | LE = BDA (node 28)<br>RI = EAE (node 22)<br>BF(-1) | Key BE<br>LE = 0 RI = 0 BF(0) | Key G<br>LE = 0 RI = 0 BF(0) |
| | Chain: Record 7 | Node chain =<br><Prev = 26 Next = 26> | Node chain =<br><Prev = 26 Next = 26> |
| | | Node container 27 | |
| EAF | LE = 0 RI = 0 BF(0) | Key EA - This view not in binary tree but is chained. | Key F - This view not in binary tree but is chained. |
| | Chain: Records 8<->12 | Node chain =<br><Prev = 24 Next = 22> | Node chain =<br><Prev = 23 Next = 23> |
| | | Node container 28 | |
| BDA | LE = ABD (node 21)<br>RI = BDE (node 25)<br>BF(-1) | Key BD - This view not in binary tree but is chained. | Key A<br>LE = 0 RI = 0 BF(0) |
| | Chain: Record 14 | Node chain =<br><Prev = 25 Next = 25> | Node chain =<br><Prev = 28 Next = 28> |

Table 3 shows the node containers that were created from the fixed record table shown in Table 2 for each unique key field combination using the exemplary methods for constructing the node container 200 and chaining records to the node container 300 according to embodiments of the disclosure. Table 3 shows the root offsets for the primary view, alternate view 1 and alternate view 2. Also shown in Table 3, is the chain of records associated with the primary view of each node container.

record or output element for class/destination/disposition with a key value of BDA, a binary search finds node container 28 in Table 3 and extracts one or more records or output elements from the chain. When the device requests records or output elements with a disposition of class/destination key value "AB", a binary search is performed on alternate view 1 and node container 20 is found. Chained to node container 20 is node container 21 and that is chained to 23. All the records or output elements for the three node containers are candidates for the given device query. The binary access is built on recorded heuristics and only uses six bytes of constrained output element real estate.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-4C illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product comprising:
   a non-transitory computer readable storage medium having computer readable program code stored thereon that, when executed, performs a method, the method comprising:
   constructing a node container including multiple binary tree views;
   creating, with a processing device, a balanced binary tree associated with a primary view within the node container, wherein the primary view comprises a primary key and a chain of all records that match the primary key;
   chaining all the records that match fields of the primary key to the primary view;
   creating one or more alternate keys by dividing the primary key into subsets, each alternative key consisting of one or more fields that is a subset of the fields of the primary key;
   creating one or more alternate views within the node container to allow access to a same set of records via the one or more alternate keys
   creating a balanced binary tree associated with each alternate view based on each alternative key; and
   extracting a chain of records from the node container that match a query search,
   wherein the balanced binary tree associated with the primary view has the primary key as its root and each of the balanced binary trees associated with the alternate views has its alternative key as its root.

2. The computer program product of claim 1, wherein the method of chaining records comprises:
   performing a binary search on multiple non-contiguous node containers for a matching one of the node containers that is associated with the primary view that matches a search key of a selected record; and
   chaining the selected record to the balanced binary tree associated with the primary view of the matching node container in response to finding the matching node container.

3. The computer program product of claim 2, wherein the method of chaining records further comprises:
   acquiring a container node, setting the primary key, and inserting the primary key into a respective balanced binary tree in response to finding no primary view matches for the selected record;
   performing a binary search on the multiple non-contiguous node containers for a matching one of the node containers that is associated with an alternate view that matches a search key of a selected record;
   chaining the acquired node container to an existing node container in response to finding the matching alternate view in the existing node container;
   inserting the alternate view into a respective balanced binary tree in response to finding no matching alternate views; and
   chaining the selected record to the primary view of the acquired container node.

4. The computer program product of claim 1, wherein only primary key values are stored in the container node.

5. The computer program product of claim 1, wherein a query that matches the primary key will extract all chained records from the primary view.

6. The computer program product of claim 1, wherein a query that matches an alternate view will extract records from the primary view of all node containers chained to the alternate view.

7. The computer program product of claim 1, wherein the root of the primary view binary tree is different than the root of each of the alternate view binary trees.

8. A computer system comprising:
   a processor, a system memory, and a bus that couples various system components including the system memory to the processor, the system configured to perform a method comprising:
   constructing a node container corresponding to a fixed record table;
   creating a primary view balanced binary tree within the node container, the primary view balanced binary tree associated with a primary view of the node container, wherein the primary view balanced binary tree comprises a primary key and a chain of all records that match the primary key;
   chaining all the records that match fields of the primary key to the primary view;
   creating one or more alternate keys by dividing the primary key into subsets, each alternative key consisting of one or more fields that is a subset of the fields of the primary key;
   creating, based on the one or more alternate keys of the fixed record table, one or more alternate view balanced binary trees within the node container;
   creating a balanced binary tree associated with each alternate view based on each alternate key; and
   extracting a chain of records from the node container that match a query search,
   wherein the primary view balanced binary tree has the primary key as its root and each of the one or more alternate view balanced binary trees has its alternative key as its root.

9. The computer system of claim 8, wherein the method of chaining records comprises:
   performing a binary search on multiple non-contiguous node containers for a matching one of the node containers that is associated with the primary view balanced binary tree that matches a search key of a selected record; and
   chaining the selected record to a primary view balanced binary tree of the matching node container in response to finding the matching node container.

10. The computer system of claim 9, wherein the method of chaining records further comprises:
   acquiring a container node, setting the primary key, and inserting the primary key into a respective balanced binary tree in response to finding no primary view matches for the selected record;
   performing a binary search on the multiple non-contiguous node containers for a matching one of the node containers that is associated with an alternate view that matches a search key of a selected record;
   chaining the acquired node container to an existing node container in response to finding the matching alternate view in the existing node container;
   inserting the alternate view into a respective balanced binary tree in response to finding no matching alternate views; and
   chaining the selected record to the primary view of the acquired container node.

11. The computer system of claim 8, wherein a key of an alternate view can match the records in multiple container nodes.

12. The computer system of claim 8, wherein a query that matches the primary key will extract all chained records from the primary view.

13. The computer system of claim 8, wherein a query that matches an alternate view will extract records from the primary view of all node containers chained to the alternate view.

14. The computer system of claim 9, wherein the root of the primary view binary tree is different than the root of each of the alternate view binary trees.

15. A computer-implemented method comprising:
   constructing a node container including multiple binary tree views;
   creating, with a processing device, a balanced binary tree associated with a primary view within the node container, wherein the primary view comprises a primary key and a chain of all records that match the primary key;
   chaining all the records that match fields of the primary key to the primary view;
   creating one or more alternate keys by dividing the primary key into subsets, each alternative key consisting of one or more fields that is a subset of the fields of the primary key;
   creating one or more alternate views within the node container to allow access to a same set of records via the one or more alternate keys; and
   extracting a chain of records from the node container that match a query search,
   wherein the balanced binary tree associated with the primary view has the primary key as its root and each of the balanced binary trees associated with the alternate views has its alternative key as its root.

16. The computer-implemented method of claim 15, wherein the method of chaining records comprises:
   performing a binary search on multiple non-contiguous node containers for a matching one of the node containers that is associated with the primary view that matches a search key of a selected record; and chaining the selected record to a primary view binary tree of the matching node container in response to finding the matching node container.

17. The computer-implemented method of claim 16, wherein the method of chaining records further comprises:
   acquiring a container node, setting the primary key, and inserting the primary key into a respective balanced binary tree in response to finding no primary view matches for the selected record;
   performing a binary search on the multiple non-contiguous node containers for a matching one of the node containers that is associated with an alternate view that matches a search key of a selected record;
   chaining the acquired node container to an existing node container in response to finding the matching alternate view in the existing node container;
   inserting the alternate view into a respective balanced binary tree in response to finding no matching alternate views; and
   chaining the selected record to the primary view of the acquired container node.

18. The computer-implemented method of claim 15, wherein only primary key values are stored in the container node.

19. The computer-implemented method of claim 15, wherein a key of an alternate view can match the records in multiple container nodes.

20. The computer-implemented method of claim 15, wherein a query that matches an alternate view will extract records from the primary view of all node containers chained to the alternate view.

21. The computer-implemented method of claim 15, wherein the root of the primary view binary tree is different than the root of each of the alternate view binary trees.

* * * * *